United States Patent [19]

Less

[11] Patent Number: 5,265,376

[45] Date of Patent: Nov. 30, 1993

[54] ARRANGEMENT IN PLANT COLUMNS

[76] Inventor: Karl H. Less, Hammarvägen 51, Järfälla, Sweden, S-175 35

[21] Appl. No.: 966,608

[22] Filed: Oct. 26, 1992

Related U.S. Application Data

[63] Continuation of Ser. No. 688,595, filed as PCT/SE90/00005, Jan. 3, 1990, published as WO90/07266, Jul. 12, 1990, abandoned.

[30] Foreign Application Priority Data

Jan. 9, 1989 [SE] Sweden ................ 8900044

[51] Int. Cl.$^5$ .............................. A01G 9/02
[52] U.S. Cl. ................................. 47/83
[58] Field of Search ..................... 47/82, 83, 59

[56] References Cited

U.S. PATENT DOCUMENTS

| D. 262,274 | 12/1981 | Lahr | 47/82 |
| 262,335 | 8/1882 | Wagner | 47/83 |
| 4,059,922 | 11/1977 | DiGialinto | 47/82 |
| 4,218,847 | 8/1980 | Leroux | 47/82 |
| 4,268,994 | 5/1981 | Urai | 47/82 |
| 4,295,296 | 10/1981 | Kinghorn | 47/82 |
| 4,339,891 | 7/1982 | Bassett | 47/81 |
| 4,574,520 | 3/1986 | Arledge | 47/59 |
| 4,756,120 | 7/1988 | Arledge | 47/82 |
| 4,869,019 | 9/1989 | Ehrlich | 47/82 |
| 4,986,027 | 1/1991 | Harvey | 47/82 |

FOREIGN PATENT DOCUMENTS

| 3223644 | 12/1983 | Fed. Rep. of Germany | 47/83 |
| 363960 | 2/1974 | Sweden . | |
| 370002 | 9/1974 | Sweden . | |
| 2029187 | 3/1980 | United Kingdom | 47/83 |
| 2154414 | 9/1985 | United Kingdom . | |

Primary Examiner—Terry Lee Melius
Assistant Examiner—Joanne C. Downs
Attorney, Agent, or Firm—Shapiro and Shapiro

[57] ABSTRACT

A plant column comprises a substantially columnar casing defining a substrate containment space for containing a plant growing substrate. The casing has a substantially vertical first wall portion and means defining a plurality of plant pockets each with a corresponding opening through the first wall portion. Each plant-pocket defining means includes a respective curved lower wall portion extending obliquely upwardly outwardly from the first wall portion and forming a support for a root-ball of a plant and a respective curved upper wall portion extending obliquely downwardly inwardly from the first wall portion and forming a support for the plant growing substrate above a corresponding opening of the plant pocket through the first wall portion. In one preferred form, the plant pockets are substantially vertically aligned, and the upper wall portion of each pocket substantially merges into the lower wall portion of the next pocket thereabove. In a second preferred form, the plant pockets are vertically spaced, with each lower wall portion and the corresponding upper wall portion constituting parts of a pipe which is received in a corresponding hole in the first wall portion, the pipe including abutment portions which lockingly engage edges of the hole.

11 Claims, 3 Drawing Sheets

ARRANGEMENT IN PLANT COLUMNS

This is a continuation of application Ser. No. 688,595 filed as PCT/SE90/00005, Jan. 3, 1990, published as WO90/07266, Jul. 12, 1990, now abandoned.

The present invention relates to an arrangement in plant columns such as are used for vertical growing of plants.

For example, Swedish patent specification 363,960 discloses an arrangement for so-called vertical growing of plants, which consists of a column-shaped container comprising a plurality of interconnectible elements and having a number of apertures which are defined downwards by outwardly folded margins. The container is filled with soil, and seeds or plants can be put to grow in the apertures with the outwardly folded margins. British patent application 2,254,414 discloses a similar arrangement which also consists of a column-shaped container which can be filled with soil and has a plurality of apertures. In contrast to the arrangement according to the first-mentioned publication, this one has no outwardly folded margin. Instead, a panel of material which is partly separated as the aperture is being made, is folded back so as to form an inwardly inclined flap which upwardly defines a cavity in the soil directly opposite the aperture, such that inside the lower margin of the aperture a substantially horizontal soil surface can be provided.

The prior art arrangements are adapted to be free-standing and consequently have apertures on every side.

In these prior art plant columns, the plants must be replanted, which must be considered a serious drawback.

It is a fact that a so-called transplant shock arises when the root systems of pregrown plants are replanted in new surroundings. There will be acclimatisation problems owing to the damage caused to the root system during replanting, and also owing to the environmental conditions which are characteristic of the species and the developmental phase which the plants have reached at the time of replanting. One object of the invention thus is to render replanting of plants possible which have been pregrown on a horizontal surface and have different root-ball systems, to a plant column, without the root system of the plant being affected by the replanting operation and without the new surroundings disturbing the root system.

One advantage of so-called vertical growing which can be compared to a bearing tree, is that the usable soil surface is larger than the ground surface required for the plant column. The ground or floor surface is better utilised. Also in view of the plants' requirements for light and air around the unit for vertical growing of plants, the required ground or floor surface is considerably smaller than the soil surface offered by the same unit or column for vertical growing of plants. In horizontal growing, the ground surface needed and the soil surface are the same size.

A plant column or a unit for vertical growing and its usable soil surface provide for a larger number of growing positions, i.e. accommodate more plants than the same soil surface would allow in normal horizontal growing.

The limited soil volume in a plant column makes it possible to accurately check the temperature of the growing substrate and to keep it higher than the temperature of the ground in horizontal growing. This difference in temperature promotes growth and results in earlier and better crops.

Vertical growing requires no herbicides and also reduces the need of remedy for soil-bound diseases and attacks.

A further advantage is that fruits like strawberries do not lose aroma owing to soil dampness caused by rain.

Of course, gathering can also be carried out more comfortably.

The above advantages imply that the basic costs per unit area are lower, especially in greenhouse cultivation where the growing potential of the floor or ground surface increases and the costs for different herbicides and the like are reduced. One condition that must be fulfilled if good results are to be obtained is, however, that replanting can be carried out such that the damage to the plants is minimised and the growing cycle is not disturbed in that the plants are subjected to an acclimatisation shock.

The object of the present invention is to provide a so-called plant column which can be free-standing or disposed adjacent a wall and is adapted to directly receive pregrown plants without replanting, both plants cultivated in pots made of, for example, compressed peat material or cellulose, or in mesh material pots, and plants cultivated in a bed in tubular containers whose both ends are open.

Pregrowing is effected horizontally in conventional manner on small surfaces where sunlight or artificial light can be used for forcing purposes. Forcing of plants requires minimal spaces for the individual plants and can be carried out on an industrial scale for delivery to individual growers or consumers. Pregrowing occurs in small pots or cups of compressed peat material, cellulose, mesh material or the like, or in tubular sleeves filled with substrate and open in both ends. Such pots, sleeves and the like can also be made of paper-based material, plastics or the like and serve merely to hold together the root system of each plant and separate the plant from neighbouring plants. Since pregrown plants can be directly inserted in the plant column, without removal of the pot or sleeve, the risk that the plant is subjected to a shock due to such replanting, is eliminated, and the plant continues to grow immediately in the new position.

Some embodiments of the arrangement according to the invention will be described in more detail in the following, reference being had to the accompanying drawings in which.

The actual plant column is made of panels 1 of sheet material. The panels, which may be flat or curved, may by means of locking strips enclosing projecting edges 2 or by means of screw joints, gluing or the like, be joined together to circular, semicircular or polygonal columns. The side of each panel facing the interior of the column is formed with grooves adapted to support substantially horizontal plates or partitions of which the lower one carries substrate material, soil and the like. On the upper partition, a water container for watering can be arranged, and a lid for preventing evaporation is suitably arranged above the water container at the end of the column.

The column can be attached to or supported by a posteriorly situated wall. If the column is positioned adjacent a wall, the rear side is formed of a flat panel 3, and an impermeable bottom is arranged at the lower end of the column and provided with a drain cock or plug for drained water and for checking that the substrate is saturated. In a one-section column which normally is adapted to be mounted on a wall or the like and in which the flat unit closing the rear side of the column forms part of supporting means, the joint between the wall panel and the column as such should be designed to eliminate the risk that water and substrate leak out. The joining together can be effected by means of U-shaped clamping strips which can be supplemented with rivets, screws or like means, and a suitable jointing compound, adhesive or the like.

The column can advantageously be free-standing and then comprises, instead of a flat rear side 3, one more curved panels 1, such that the column is substantially circular in cross-section.

Figure 1:
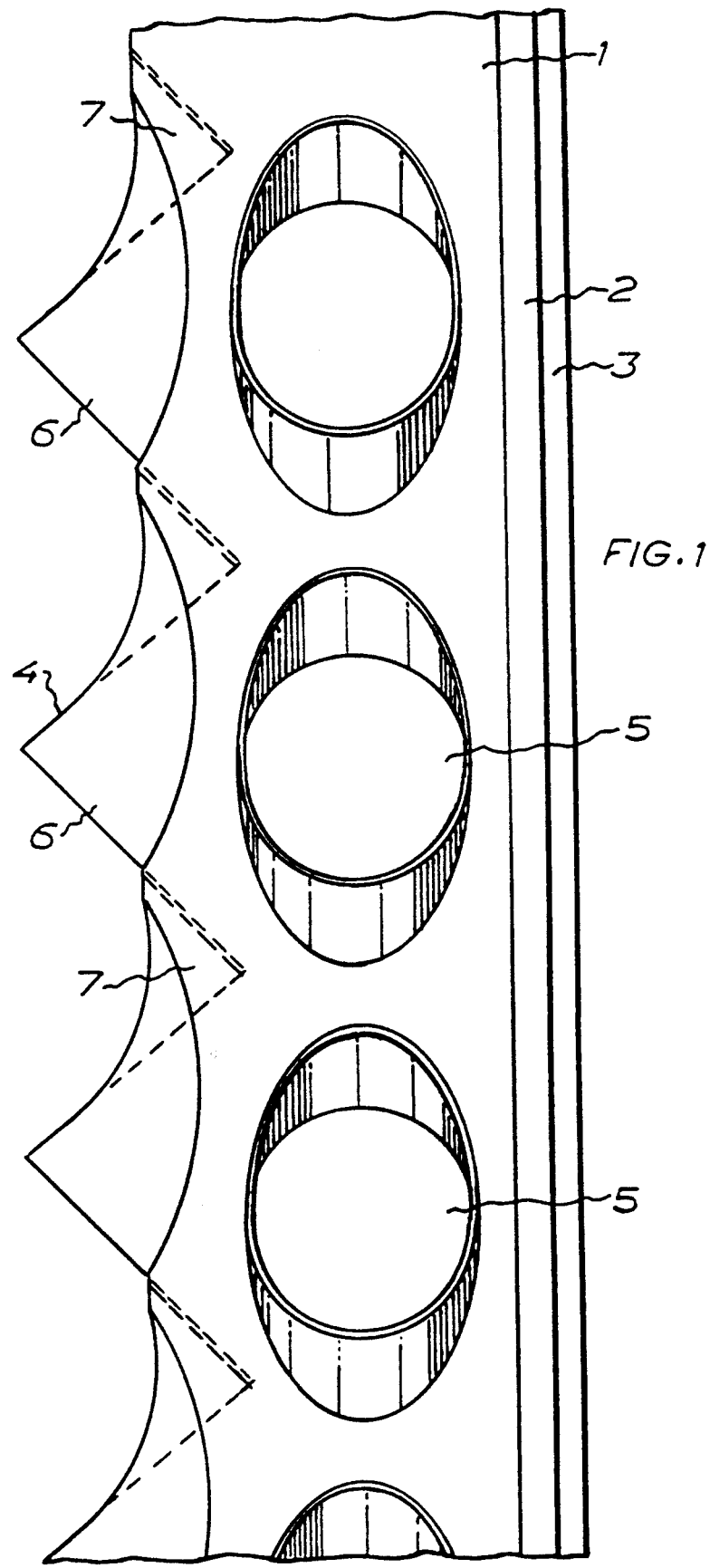
FIG. 1 is a side view of a portion of a so-called plant column in a first embodiment.

In the embodiment illustrated in FIG. 1, each of a plurality of plant pockets 4 has an opening 5 formed in the panel 1 of the plant column and is downwardly defined (i.e., at a lower portion) by a flap-shaped curved portion 6 which extends obliquely upwards and outwards and forms a balcony-like projection, and is upwardly defined (i.e., at an upper portion) by a flap-shaped portion 7 which is also conveniently curved and extends obliquely downwards and inwards. The lower portion 6 forms a support for the root-ball of the plant and/or the peat pot or the like surrounding the same, while the upper portion 7 forms a support for the substrate inside the column, thereby preventing the substrate from falling out through the opening 5.

The two curved portions 6, 7 which downwardly and upwardly define the pockets are suitably integrated with the panel in that the material—if it is thermoplastic—is somewhat heated and bent. First, one can for example make a slit-shaped opening in the circumferential direction, then heat the material and insert a suitable tool in the slit and pivot the tool in the longitudinal direction of the column, such that the material below the slit is bent outwards and the material above the slit is bent inwards.

Figure 2:
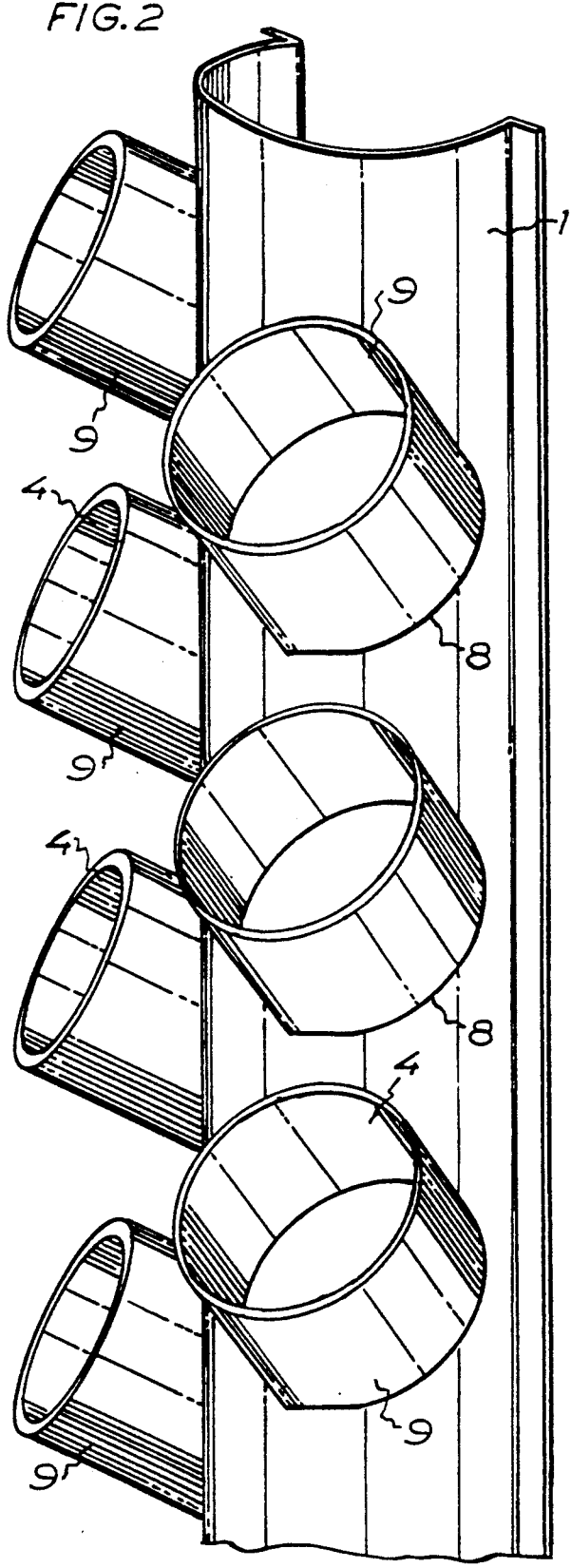
FIG. 2 shows a portion of a second embodiment of the plant column as seen obliquely from one side.
Figure 3:
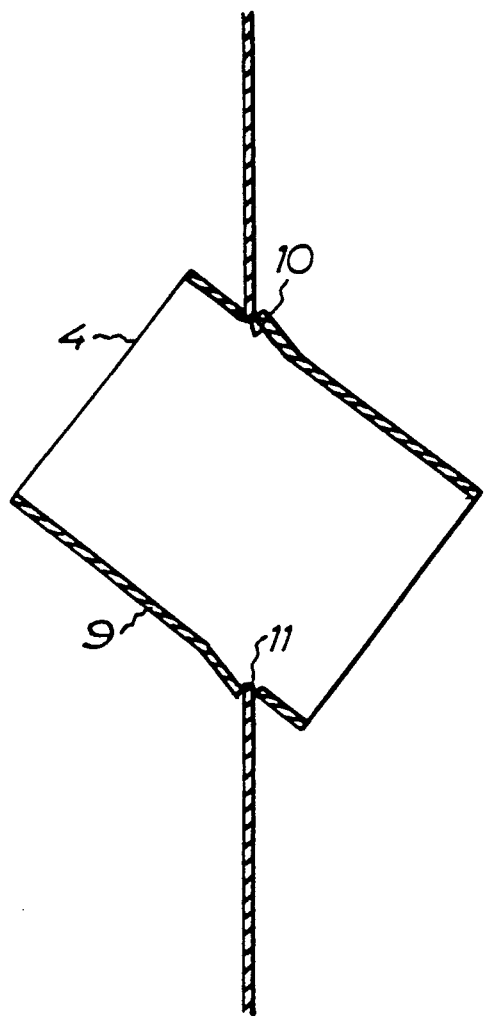
FIG. 3 is a cross-sectional view through the centre of one of the tubular inserts in the embodiment shown in FIG. 2.

In the embodiment shown in FIGS. 2 and 3, the arcuately curved panel 1 forming the actual plant column is provided with a large number of oval or non-circular holes 8 in which short tubular pipes 9 which are inclined obliquely upwards, are inserted and secured. The dimensions and the shape of the edges defining the holes 8 in relation to the pipe dimension determine the direction of the pipe member.

The pipes 9 are at the top and at the bottom formed with slits or projections 10, 11 which are relatively offset in the axial direction. When the pipe is inserted in the associated hole, the upper and lower edge of the hole will snap into these slits 10, 11—when the correct angular position has been taken—and will thus secure the pipe against displacement both inwards and outwards and against pivoting.

In the same manner as in the embodiment described above, a projecting curved portion is provided which forms a support for the root-ball of the plant, optionally with a pot or pipe, and the space in the column is inwardly and upwardly defined, whereby the substrate is prevented from falling out through the hole before insertion of a plant.

The axial length of the pipe is adapted such that a plant inserted therein comes into contact, as intended, with the substrate in the plant column.

One advantage of using a column which only has holes 8 in combination with pipes 9 which are insertable into the holes, is that the pipes themselves can serve as a holder or "pot" for plants during pregrowing. To this end, pipes filled with substrate are disposed on a suitable horizontal bed, whereupon seeds or cuttings are placed in the pipes. When the plants have reached the intended size, the pipes 9 together with the plant and the root-ball with its clod of substrate can be directly inserted in the plant column where the plant continues to grow.

By having two or more sets of such pipes, the plant column can be maximally utilised, since one set can be used for pregrowing of plants, while another set is positioned in the plant column etc.

The above-mentioned pipes need not necessarily be precisely tubular, but can in some cases be replaced by U-shaped channels, whereby the upper fixing means 10 is omitted and replaced by notches formed in the edges of the U-shaped member, said notches engaging the side portions of the edge of the respective hole.

By using column portions which can be joined together, a plant column consisting of two sections allows culturing of plants of different types and having different substrate requirements, even plants which in their root system produce substances having a detrimental effect on other plants. This is possible in that the column is divided by means of an impermeable vertical boundary panel which is similar to, for example, the panel 3 and is disposed between the two sections 1 before joining thereof.

Figure 4:
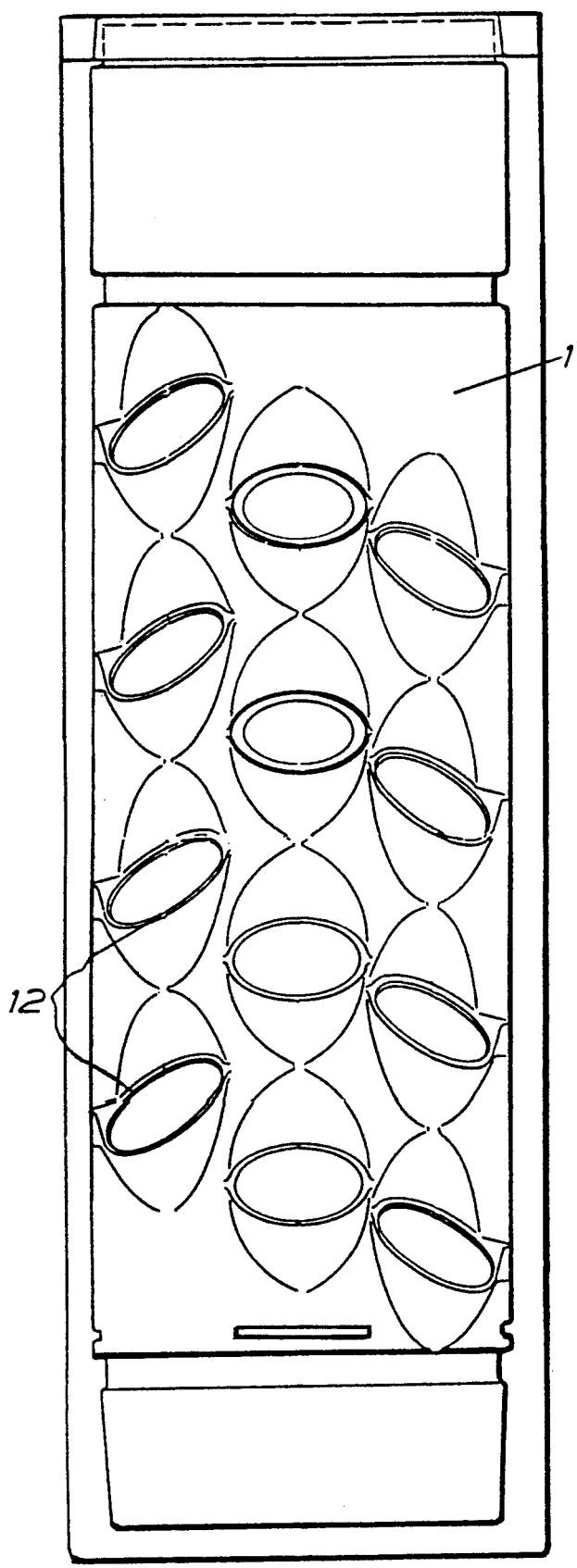
FIG. 4 is a front view of a further embodiment.
Figure 5:
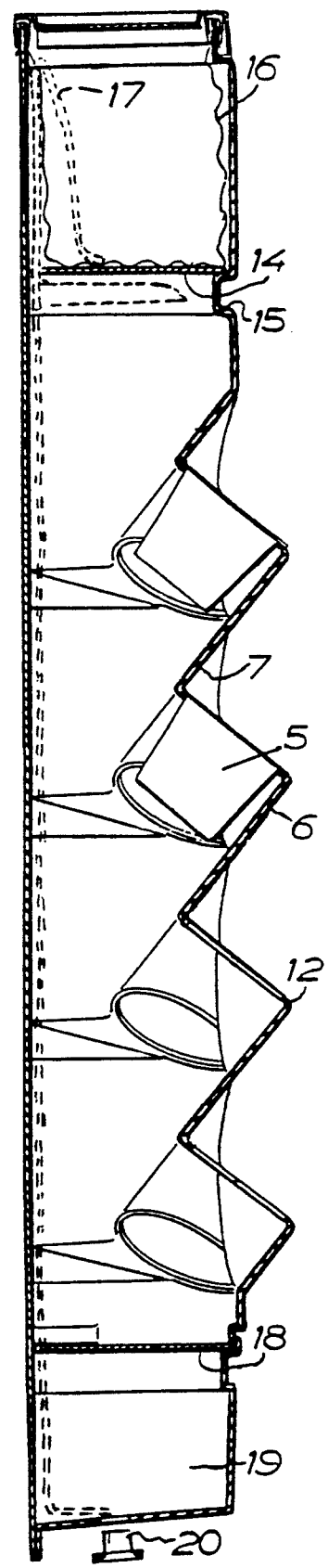
FIG. 5 is a side view of the embodiment shown in FIG. 4, partly in section.

Also the embodiment in FIGS. 4 and 5 is advantageously made of a formable sheet or panel material 1 which by vacuum forming is given the intended shape. Alternatively, the major part of the plant column can, however, in this embodiment be formed by injection moulding.

As in the embodiment shown in FIG. 1, a plurality of plant pockets having openings 5 are formed in the curved part 1 and are downwardly defined by projecting portions 6 and upwardly defined by inwardly extending portions 7. In the aperture which is defined by the upper edge of the projection 6 and the lower edge of the projection 7, there is provided an inwardly extending flange 12 which is adapted to be engaged by the edge of a standard growing pot. Such pots are made in only a few sizes, and the flange can be adapted so that the largest pots can be received inwardly thereof. If smaller pots are to be used, they can simply be provided with an adaptor having an outer diameter corresponding to that of the large pot.

The embodiment in FIGS. 4 and 5 can be used either as a so-called half column with a rear portion 3 attached to the edge flanges 13, or as a full column comprising two interconnected semicircular portions.

In the upper portion of the column there is mounted a partition 14 adapted to rest against a groove 15 formed in the panel 1, and the space above the partition 14 accommodates a water container 16. This is bag-shaped and made of a soft impermeable, strong material and is mounted in that its marginal portion is pulled over the edge of the panel 1 and the rear portion 3 and is fixed by means of a U-moulding. The water container can be provided with a dropping tube through which water successively drips into the interior of the plant column so as to be collected and distributed in the substrate. In the preferred embodiment, a wick means 17 is preferably used, i.e. a strip or the like of a spongy or porous material, which is hung over the edge of the water container and whose one end extends into the water container and whose other end reaches the substrate. By choosing a suitable material and area, the watering volume per unit of time can be precisely determined. One advantage of the wick watering system to the dripping system in which water is allowed to drip through a tube or the like is that the risk of spilling is significantly smaller in the first-mentioned system.

At the bottom of the unit 1 there is a further partition 18 serving as a support for the substrate in the plant column, and this partition is adapted to let through excessive water, if any, which can be collected in the container 19 and, when desired, be emptied by removal of the plug 20.

If a number of plant columns are arranged side by side, one can of course provide a central watering means, i.e. a central container with a water mains connection, from which so-called microtubes extend to each of the columns. The watering means should be provided with control means to facilitate drip watering and accurate control of the supplied amount of water.

In most cases, the technique of using a wick means as indicated above is preferred. A mat of suitably dimensioned capillary material, which functions as a wick, can extend from the bottom of the water container, over the edge thereof and be folded back on itself under the bottom of the container and can then extend downwards along the rear wall in contact with the substrate, the lower end of the mat hanging down in the drainage container 19. This results in an appropriately slow and even supply of water and brings the further advantage that any water dripping down in the drainage container 19 will be sucked up again and distributed in the substrate.

Such watering by means of a capillary mat is of great value since, at the same time as the necessary supply of water is ensured, it eliminates the risk that the substrate is soaked. Also in slow drip watering, a certain impoverishment of the substrate can occur in that nutritive substances and—especially at high temperatures—the vital nitrogen compounds are removed by soaking.

In countries where the supply of water is limited, the use of capillary watering implies a significantly improved utilisation of the water and a reduction of loss owing to evaporation and waste.

The plant column shown in FIGS. 4 and 5 is suited for seed-growing as well as growing of pregrown plants with or without pot, and with the root-ball enclosed by cloth. In seed-growing, the seed is sown directly in the substrate which is then allowed to come up in the openings 5. When pot-grown plants are used, the substrate is hollowed out directly opposite each opening, such that the bottom portion of the pot is perfectly enclosed by the substrate.

It is prior art to use elongate tubes or bags of plastic sheeting which are filled with substrate for pregrowing of plants. Such tubes and bags can of course be used together with the plant column according to the invention, and in a not shown embodiment especially intended therefor, the front and rear portion of the plant column are joined together by a hinge means such that they can be separated so as to allow insertion of a tube filled with substrate. After the column parts have again been joined together, it is possible to make apertures in the tube on a level with each plant pocket by means of a knife or the like, and sow or plant directly in the apertures or the positions of the pipes and the uncovered substrate.

Since the peat pot or the root-ball of a pregrown plant will be supported against the projecting portion connected with the lower part of the aperture, while the interior of the root-ball through the cut hole reaches the substrate in the tube, cultivation shocks are avoided and handling is, to a high degree, facilitated.

To make it easier for the grower, the plant column according to the invention can, when delivered, be provided with the necessary substrate in the form of compressed peat mould in slices which suitably can be packed, enclosed in sheeting inside the plant column. The buyer only needs to add water to make the peat slices swell to the required volume filling the plant column. Of course, also nutritive substances, fertilisers etc. can be enclosed.

In the embodiments illustrated and others that are feasible, the inventive plant column facilitates handling in connection with growing of ornamental as well as utility plants, minimises the need of space in the lateral direction, makes it possible to use both pregrown plants and seed growing and elminates, through the design of plant pockets, any risks of so-called cultivation shocks.

The design and the function make the plant column fit for professional use and for use in market gardens and the like. In the latter case, a number of so-called full columns can be hung up in stands in a greenhouse, whereby on the same floor surface space is provided for a many times greater number of plants as compared with conventional horizontal growing in cases, trays or the like.

I claim:

1. A plant column, comprising a substantially columnar casing defining a substrate containment space for containing a plant growing substrate, said casing having a substantially vertical first wall portion and means defining a plurality of substantially vertically aligned plant pockets each with a corresponding opening through said first wall portion, said plant-pocket defining means each including a respective curved lower wall portion extending obliquely upwardly outwardly from said first wall portion and forming a support for a root-ball of a plant and a respective curved upper wall portion extending obliquely downwardly inwardly from said first wall portion and forming a support for the plant growing substrate above the corresponding opening with the upper wall portion of each plant pocket substantially merging into the lower wall portion of the next plant pocket thereabove.

2. A plant column according to claim 1, wherein said casing is constituted of a plurality of panels interconnectible to one another along substantially vertical edges thereof.

3. A plant column according to claim 2, wherein said casing further comprises means beneath said substrate containment space and defining a collecting space for water drained from the substrate.

4. A plant column according to claim 2, wherein said casing is formed with at least two elongate panels joined at adjacent vertical edges in a hinge-like manner.

5. A plant column according to claim 1, wherein the respective lower wall and upper wall portions of each plant pocket are formed integrally with said first wall portion.

6. A plant column according to claim 5, wherein said upper and lower wall portions are formed by bending in and bending out, respectively, portions of material positioned above and below a slit-shaped opening in said first wall portion.

7. A plant column according to claim 1, further comprising means disposed on top of said casing and defining a space which receives a water container made of an impermeable material and having means for controlled supplying of water to the plant growing substrate therebelow.

8. A plant column according to claim 7, wherein said water supplying means includes wick means of capillary material having one end located inside said water container and extending downwardly within said casing for engagement with the plant growing substrate along the height of the plant column, and another end disposed within a water drainage collection container disposed beneath the substrate containment space.

9. A plant column, comprising a substantially columnar casing defining a substrate containment space for containing a plant growing substrate, said casing having a substantially vertical first wall portion and means defining a plurality of vertically spaced plant pockets each with a corresponding opening through said first wall portion, said plant-pocket defining means each including a respective curved lower wall portion extending obliquely upwardly outwardly from said first wall portion and forming a support for a root-ball of a plant and a respective curved upper wall portion extending obliquely downwardly inwardly from said first wall portion and forming a support for the plant growing substrate above the corresponding opening, each lower wall portion and the corresponding upper wall portion constituting parts of a pipe which is received in a corresponding hole in said first wall portion, said pipe including abutment means which lockingly engage edges of said hole.

10. A plant column according to claim 9, wherein said abutment means are constituted by projections formed on upper and lower sides of said pipe and offset from one another in an axial direction of said pipe.

11. A plant column according to claim 9, wherein said pipe is detachable from said first wall portion and configured for pregrowing a plant on a horizontal base prior to arrangement of the plant and pipe on said first wall portion, with the pipe then serving to define a said plant pocket.

* * * * *